United States Patent
Tylutki et al.

(10) Patent No.: US 8,966,882 B2
(45) Date of Patent: Mar. 3, 2015

(54) DIFFERENTIAL PRESSURE-BASED ENABLEMENT OF A PARTICULATE FILTER DIAGNOSTIC

(75) Inventors: Vincent J. Tylutki, Livonia, MI (US); Benjamin Radke, Waterford, MI (US); Janean E. Kowalkowski, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 113 days.

(21) Appl. No.: 13/611,368

(22) Filed: Sep. 12, 2012

(65) Prior Publication Data

US 2014/0069081 A1 Mar. 13, 2014

(51) Int. Cl.
 *F01N 3/021* (2006.01)
(52) U.S. Cl.
 USPC .............................. 60/277; 60/311
(58) Field of Classification Search
 CPC ............. F02D 2041/1422; F02D 41/1448; F02D 41/2441; F02D 41/2474
 USPC .......................... 60/277, 297, 311
 See application file for complete search history.

(56) References Cited

U.S. PATENT DOCUMENTS

| | | | |
|---|---|---|---|
| 7,263,825 B1* | 9/2007 | Wills et al. ..................... | 60/295 |
| 2008/0041645 A1* | 2/2008 | Bauerle ........................ | 180/65.2 |
| 2010/0058743 A1* | 3/2010 | Tsukada et al. ................ | 60/287 |
| 2011/0320103 A1* | 12/2011 | Liu et al. ...................... | 701/102 |

FOREIGN PATENT DOCUMENTS

| | | | |
|---|---|---|---|
| DE | 10145863 A1 | 4/2003 | |
| EP | 2261474 A1 | 12/2010 | |

* cited by examiner

*Primary Examiner* — Kenneth Bomberg
*Assistant Examiner* — Jonathan Matthias
(74) *Attorney, Agent, or Firm* — Quinn Law Group, PLLC

(57) ABSTRACT

A vehicle includes an engine, an exhaust system having a particulate filter which removes soot from the exhaust stream, a sensor, and a controller. The sensor measures instantaneous differential pressure across the filter. The controller executes a method to selectively enable or disable execution of an efficiency diagnostic of the filter as a function of a learned differential pressure offset value. The controller may also compare the differential pressure to a calibrated threshold and execute a control action when the differential pressure falls within an allowable range of the threshold. This may include applying the differential pressure offset value and enabling execution of the diagnostic using measurements from the zeroed sensor. Another control action may be executed when the measured differential pressure is not within the allowable range of the threshold, including disabling the execution of the diagnostic and setting a diagnostic code indicating that the sensor may be faulty.

20 Claims, 2 Drawing Sheets

DIFFERENTIAL PRESSURE-BASED ENABLEMENT OF A PARTICULATE FILTER DIAGNOSTIC

TECHNICAL FIELD

The present disclosure relates to a system and method for enabling a diagnostic of a particulate filter using differential pressure measurements.

BACKGROUND

The exhaust stream of a diesel engine is typically filtered using a diesel particulate filter (DPF). The DPF, which is positioned in the exhaust stream downstream of a catalyst, captures engine soot and other suspended particulate matter before it can be discharged via the tailpipe into the surrounding atmosphere. Soot production is heavily influenced by engine operation, for instance EGR valve position, turbo position, fuel injection timing, etc. Over time, soot loading accumulates in the porous media of the DPF. In-situ thermal regeneration of the DPF is therefore conducted periodically to burn off accumulated particulate matter.

DPF regeneration is typically performed by temporarily elevating the temperature of the exhaust stream passing through the DPF. A metered stream of fuel is injected into the exhaust stream. The exothermic reaction with a diesel oxidation catalyst (DOC) quickly raises exhaust temperatures to 600° C. or higher, thereby incinerating accumulated soot. Over time, substrate within the DPF may become cracked, melted, or pitted from repeated exposure to thermal stress and other factors. As a result, a DPF diagnostic is ordinarily performed in order to verify satisfactory performance of the DPF.

SUMMARY

A vehicle is disclosed herein that includes an engine, an exhaust system, and a controller. The exhaust system includes a particulate filter, e.g., a diesel particulate filter (DPF), that receives an exhaust stream discharged by the engine. A differential pressure ($\Delta P$) sensor is in communication with the controller. The $\Delta P$ sensor measures the instantaneous differential pressure across the filter and transmits the measured instantaneous $\Delta P$ value to the controller. The controller then selectively enables a subsequent efficiency diagnostic of the filter as a function of received instantaneous $\Delta P$ values.

To determine when to enable/disable the diagnostic, the controller may execute a set of recorded instructions whenever a key-off event of the engine is detected. The engine shuts off in response to such a key-off event. After a calibrated settling time, the controller compares the received instantaneous $\Delta P$ value to a calibrated $\Delta P$ threshold. If the instantaneous $\Delta P$ value is less than or equal to the $\Delta P$ threshold, the controller zeros the $\Delta P$ sensor, e.g., by applying an offset that is equal and opposite in magnitude to the measured $\Delta P$ value. The controller then enables execution of the efficiency diagnostic using the zeroed value. However, if the instantaneous $\Delta P$ value exceeds the threshold, the controller automatically disables or postpones execution of the diagnostic. The controller may also set a diagnostic code in memory to signal a required repair or replacement of the $\Delta P$ sensor.

A method is also disclosed herein that includes measuring an instantaneous differential pressure across a particulate filter in an exhaust stream of an engine using a sensor, receiving, via a controller, the measured instantaneous differential pressure from the sensor, and selectively enabling or disabling execution of a diagnostic of the particulate filter as a function of the instantaneous differential pressure.

In another embodiment, the method includes measuring an instantaneous differential pressure across a diesel particulate filter (DPF) in an exhaust stream of a diesel engine using a sensor, and receiving, via a controller, the measured instantaneous differential pressure from the sensor. The method also includes detecting a key-off event of the engine and selectively enabling or disabling execution of a diagnostic of the DPF as a function of the measured instantaneous differential pressure only when the key-off event is detected.

Enabling/disabling includes waiting through a calibrated settling time after detecting the key-off event, comparing the measured instantaneous differential pressure to a calibrated threshold, and executing a first control action when the measured instantaneous differential pressure is within an allowable range of the calibrated threshold. The first control action may include applying a differential pressure offset value to the measured differential pressure to thereby zero the sensor, and enabling the execution of the particulate filter efficiency diagnostic using measurements from the zeroed sensor.

The method may include executing a second control action when the measured instantaneous differential pressure is not within the allowable range of the threshold, including disabling the execution of the DPF efficiency diagnostic and setting a diagnostic code indicating that the sensor is faulty.

The above features and advantages and other features and advantages of the present invention are readily apparent from the following detailed description of the best modes for carrying out the invention when taken in connection with the accompanying drawings.

DETAILED DESCRIPTION

Figure 1:
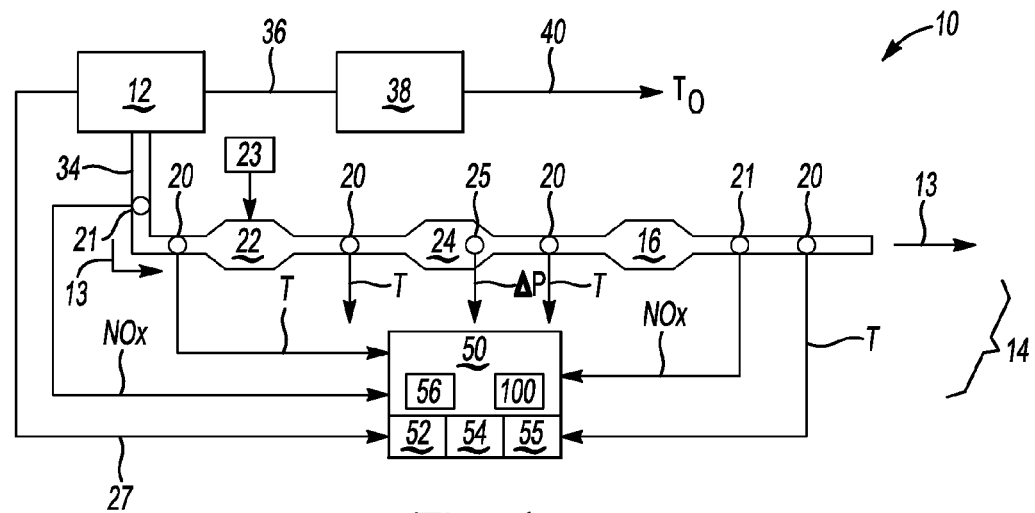
FIG. 1 is a schematic illustration of a vehicle having an exhaust system with a diesel particulate filter (DPF) and a differential pressure ($\Delta P$) sensor, as well as a controller that executes a method using instantaneous $\Delta P$ values from the sensor to selectively enable/disable a DPF efficiency diagnostic.

Referring to the drawings, wherein like reference numbers represent like components throughout the several figures, an example vehicle 10 is shown in FIG. 1. The vehicle 10 includes an internal combustion engine 12. The engine 12 is a diesel engine in the examples that follow, although direct injection-type gasoline combustion engines or other engine types may be used without departing from the intended inventive scope.

Engine torque from the engine 12 is transferred to a rotatable input member 36 of a transmission 38, which may include one or more planetary gear sets, clutches, and fluid control devices (not shown) as is well understood in the art. The transmission 38 ultimately transfers output torque ($T_O$) to a transmission output member 40 to propel the vehicle 10.

The engine 12 generates an exhaust stream 13 as a product of the fuel combustion process. The exhaust stream 13 is discharged from the engine 12 through an exhaust manifold 34 and into an exhaust system 14. The exhaust stream 13 is processed using various components of the exhaust system 14 in order to remove any entrained particulate matter, nitrogen oxide (NOx) gases, carbon monoxide gas, suspended hydrocarbons, and the like.

Figure 5:
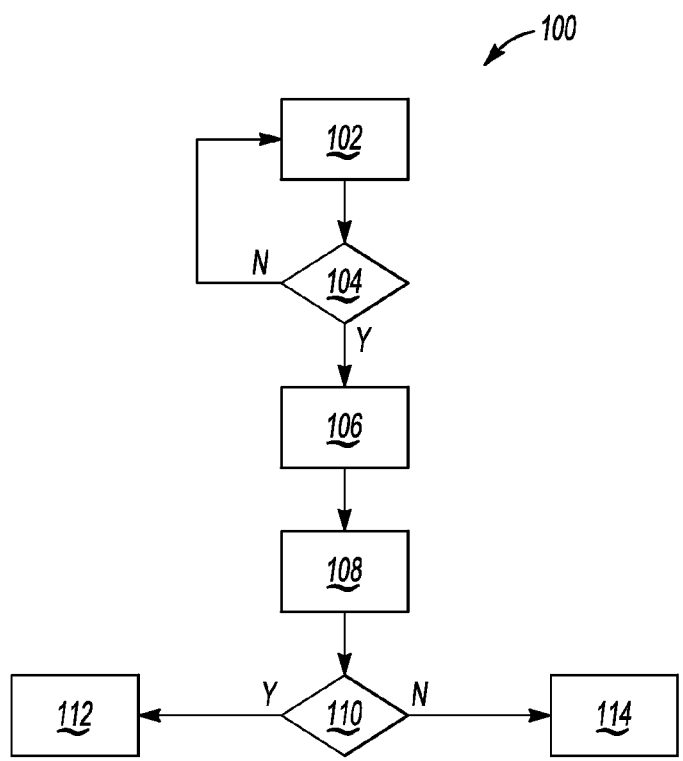
FIG. 5 is a flow chart describing an example method for enabling/disabling execution of a DPF efficiency diagnostic using instantaneous $\Delta P$ signals.

The various components of the exhaust system 14 include a particulate filter, which in keeping with the example diesel engine embodiment is referred to hereinafter as a diesel particulate filter (DPF) 24. The DPF 24 may be configured as a block of sintered ceramic foam, metal mesh, pelletized alumina, and/or any other suitable material or combination of materials. A controller 50 periodically executes recorded instructions embodying a method 100, an example of which is shown in FIG. 5. As explained in detail below, execution of the method 100 by the controller 50 selectively enables/disables subsequent execution of DPF diagnostic logic 55 as a function of differential pressure across the DPF 24.

The exhaust system 14 shown in FIG. 1 may also include a selective catalytic reduction (SCR) device 16. The SCR device 16 converts NOx gases into water and nitrogen as inert byproducts using an active catalyst. The SCR device 16 may be configured as a ceramic brick or a ceramic honeycomb structure, a plate structure, or any other suitable design having a sufficient thermal mass. NOx gases in the exhaust stream 13 react with urea or ammonia ($NH_3$) stored in or delivered to the SCR device 16, thereby reducing levels of NOx gases in the exhaust stream 13.

In addition to the SCR device 16 and the DPF 24 noted above, the exhaust system 14 may also include an oxidation catalyst 22. The oxidation catalyst 22 is in communication with a fuel injector device 23 that delivers a calibrated amount of fuel into the oxidation catalyst 22. Ignition of the injected fuel rapidly increases the temperature of the exhaust stream 13, typically to 600° C. or more, in order to enable thermal regeneration of the DPF 24. Use of the oxidation catalyst 22 in the exhaust system 14 is intended to reduce hydrocarbon and carbon monoxide levels in the exhaust stream 13, and allows for exhaust temperatures to be achieved at levels suitable for regeneration of the DPF 24.

The controller 50 that is shown schematically in FIG. 1 may be embodied as a general-purpose digital computer in communication with a plurality of exhaust temperature sensors 20, as well as with NOx sensors 21. The controller 50 may include a processor 52, along with tangible, non-transitory memory 54, e.g., read-only memory (ROM), flash memory, optical memory, additional magnetic memory, etc. The controller 50 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry.

The controller 50 of FIG. 1 receives a measured engine speed (arrow 27), whether from the engine 12 or from a separate engine control module (not shown). The controller 50 also receives temperature signals (arrows T) from the various temperature sensors 20, and NOx readings (arrows NOx) from the NOx sensors 21. Instantaneous differential pressure ΔP values (arrow ΔP) are received as signals measured by a ΔP sensor 25. The ΔP sensor 25, as is well understood in the art, measures and/or calculates a pressure differential between the inlet and outlet sides of a filter housing, in this instance the DPF 24, i.e., $\Delta P = P_{IN} - P_{OUT}$. The ΔP sensor 25 may be a unitary sensor or gauge connected to the DPF 24, or it may be embodied as a pair of pressure taps that individually read the inlet and outlet pressures and calculate the differential pressure across the DPF 24.

The controller 50 shown in FIG. 1, in the execution of the DPF efficiency diagnostic logic 55, may use various weighted regression factors such as the volumetric flow of the exhaust stream 13, the measured instantaneous ΔP across the DPF 24, the temperature of the exhaust stream 13 upstream and downstream of the DPF 24, and the temperature gradient across the DPF 24. The controller 50 may also calculate or otherwise determine the amount of soot discharged from the engine 12, a value that may be obtained from a calibrated soot model 56 stored in a lookup table in memory 54. Other regression factors may include the engine speed (arrow 27), the amount of fuel injected into the exhaust stream 13 by the fuel injection device 23, and the distance traveled, elapsed time, and total volume of fuel consumed by the engine 12 since execution of a prior regeneration of the DPF 24.

Each of the regression factors may be assigned a corresponding weight based on the relative importance of that particular factor to an ultimate decision as to whether or not the DPF 24 is functioning properly. In the present approach, the instantaneous ΔP values (arrow ΔP) from the ΔP sensor 25 may be weighted more heavily than the remaining factors, particularly at areas of greater separation between a nominal or "good" DPF 24 and a malfunctioning one, e.g., at the end of a thermal regeneration cycle. The term "separation" as used herein is described immediately hereinbelow with reference to FIG. 2. Additionally, the instantaneous ΔP values (arrow ΔP) are used by the controller 50 in the execution of the method 100 in order to determine whether or not to proceed with use of a subsequent DPF efficiency diagnostic, during a subsequent engine-on cycle, using the DPF efficiency diagnostic logic 55.

Figure 2:
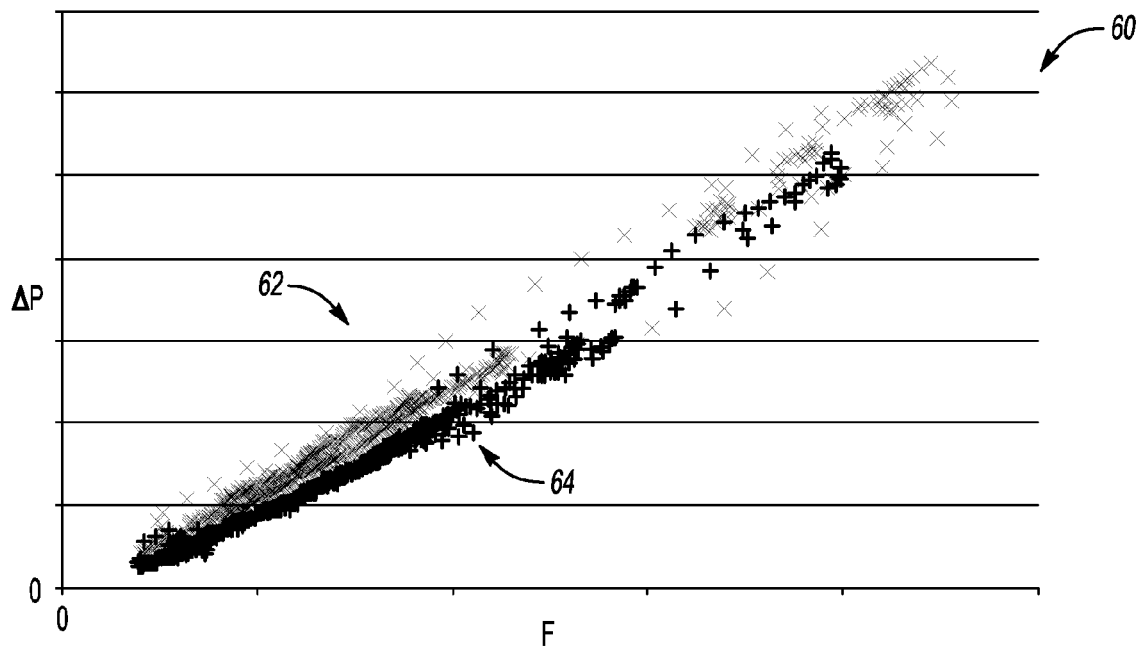
FIG. 2 is an example plot of measured instantaneous $\Delta P$ values vs. the volumetric flow rate of the exhaust stream flowing through the DPF shown in FIG. 1.

Referring to FIG. 2, an example plot 60 represents, on the horizontal axis, the volumetric flow rate (F) of the exhaust stream 13 as it passes through the DPF 24. The corresponding instantaneous differential pressure value (ΔP) is represented on the vertical axis. Raw data 62 corresponds to the performance of a nominal DPF 24, i.e., a properly functioning/validated or new DPF 24 having no discernible flaws or any appreciable damage to the internal filter media. Raw data 64 represents a damaged DPF 24 having a known set of flaws, e.g., a set of holes having a variety of sizes. Such flaws may be representative of damage that the internal media of the DPF 24 might incur over time during extended operation and thermal regeneration, most often due to thermal shock, i.e., extreme localized heating and melting of the internal media or an over-accumulation of soot and subsequent regeneration of the DPF 24.

As shown in FIG. 2, very little separation exists between the raw data 62 and 64 when using instantaneous ΔP values to evaluate the performance of a DPF 24 in the conventional threshold comparison manner. As a result, sensor error or offset value of the ΔP sensor 25 of FIG. 1, if excessive, can greatly affect the overall accuracy of any subsequent DPF performance analysis. For instance, false failures of the DPF 24 may result if the ΔP offset value is excessive. That is, a relatively expensive DPF 24 may be diagnosed as failing when in fact the ΔP offset value of the relatively inexpensive ΔP sensor 25 is the root cause of the failing diagnosis. Successful diagnosis of the ΔP sensor 25 is therefore performed herein via the method 100 of FIG. 5 as a precursor to continued execution/use of the DPF regression logic 55.

Figure 3:
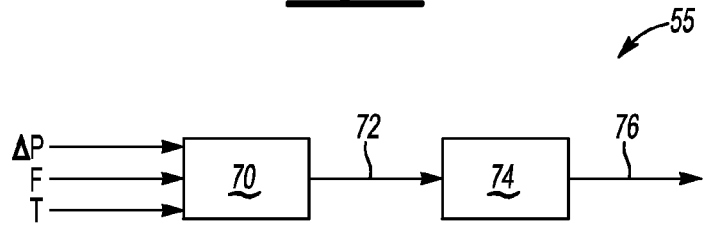
FIG. 3 is a block diagram of an example set of linear regression logic used by the controller of FIG. 1 as part of a DPF efficiency diagnostic.

Referring to FIG. 3, the recorded DPF efficiency diagnostic logic 55 used by the controller 50 of FIG. 1 may include a linearization block 70 and a filter block 74, e.g., a Kalman filter of the type know in the art. The diagnostic logic 55 first creates linearized data from the instantaneous ΔP values measured by the ΔP sensor 25 of FIG. 1. The linearized ΔP data, arrow 72, is represented in the formula below as ΔP'. Therefore, the linearization block 70 receives the measured instantaneous ΔP value as an input, as well as the calculated/measured volumetric flow rate (F) and measured temperature (T) of the exhaust stream 13. The linearization block 70 then processes the inputs using the processor 52 shown in FIG. 1 to linearize the raw data (see FIG. 2) via any suitable linear transformation technique, e.g., using the formula ΔP'=R·F+B, where R is the flow resistance through the DPF 24 and B is a constant.

The linearized data (arrow 72) is then output to the filter block 74. The filter block 74 is used to generate a diagnostic detection parameter, which is referred to hereinafter as a regression factor, i.e., arrow 76. The regression factor (arrow 76) may be calculated by the controller 50 as $$\frac{F}{\Delta P'}.$$

Figure 4:
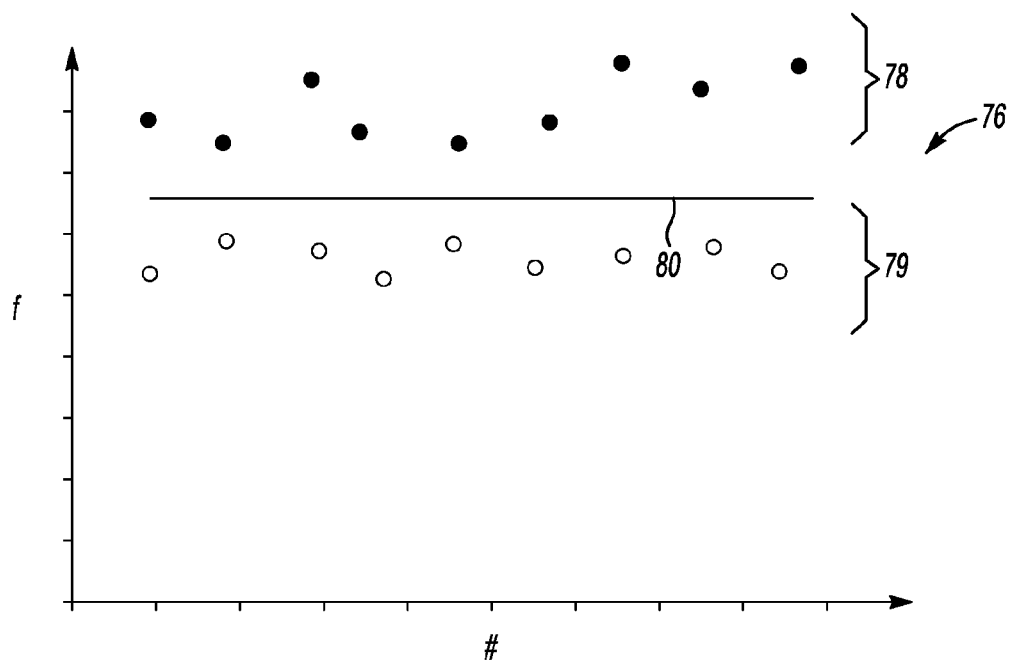
FIG. 4 is a diagram of filtered regression factors output by the linear regression logic shown in FIG. 3, with the horizontal axis indicating the sample number and the vertical axis corresponding to the filtered factor value.

Referring to FIG. 4, the regression factor 76 noted above may be represented as data clusters 78 and 79. Note that a regression factor 76 having a larger value corresponds to a larger/more severe fault, in this example a fault of the ΔP sensor 25. The controller 50 may use a calibrated threshold 80 to evaluate each of the regression factors, with values recorded below the threshold 80 being passing/desirable results, and those falling above the threshold 80 corresponding to failing/undesirable results. Data cluster 79 corresponds to the raw data 62 shown in FIG. 2. Likewise, data cluster 78 corresponds to the raw data 64 shown in the same Figure. Whereas the raw data 63 and 64 shows minimal separation in FIG. 2, improved separation is provided between results in FIG. 4 due to the use of the DPF efficiency diagnostic logic 55 shown in FIG. 3.

Referring to FIG. 5, the method 100 uses instantaneous ΔP values as measured by the ΔP sensor 25 to enable the subsequent execution of DPF efficiency diagnostics, e.g., using the DPF efficiency diagnostic logic 55 described above. The method 100 begins at step 102, wherein the controller 50 of FIG. 1 detects an ignition state of the vehicle 10, whether by measuring current through a starter switch, detecting a key/switch position, or by any other suitable steps. The method 100 proceeds to step 104 once the ignition state has been detected.

At step 104, the controller 50 next determines whether the ignition state detected at step 102 corresponds to a key-off or engine-off state. If so, the method 100 proceeds to step 106. Otherwise, the controller 50 repeats step 102.

At step 106, the controller 50 of FIG. 1 may initiate a timer to allow a sufficient amount of settling time to elapse after shutdown of the engine 12. The settling time provided by step 106 should be sufficient for any residual exhaust flow in the exhaust system 14 of FIG. 1 to stop flowing. The method 100 proceeds to step 108 once the calibrated settling time has elapsed.

At step 108, the controller 50 of FIG. 1 next receives the instantaneous ΔP measurement, i.e., arrow ΔP of FIG. 1, from the ΔP sensor 25 shown in the same Figure. The controller 50 then temporarily records the received value in memory 54 before proceeding to step 110.

At step 110, the controller 50 of FIG. 1 compares the value received in step 108 to a calibrated ΔP offset value. In a typical embodiment, the calibrated ΔP offset value is a tolerance of a validated/new ΔP sensor 25, e.g., less than about ±1-2 hecto Pascal (hPa). If the received value is within an allowable range of the calibrated offset value, such as within 10 hPa of this value, the method 100 proceeds to step 112. In another embodiment, the method 100 proceeds to step 112 only if the instantaneous ΔP value is within the tolerance of the ΔP sensor 25. Use of a maximum ΔP offset value at step 110 is intended to reduce the risk of using inaccurate measurements from the ΔP sensor 25 of FIG. 1 as an input in any subsequent DPF regression analysis. The method 100 proceeds to step 114 only if the received value of the ΔP signal is not within an allowable range of the calibrated ΔP offset value.

At step 112, the controller 50 learns and applies a ΔP offset value, thereby effectively zeroing the ΔP sensor 25, and then proceeds to use the DPF efficiency diagnostic logic 55 of FIG. 3 as explained above. The results of step 112 may include a determination that the DPF 24 of FIG. 1 is or is not functioning properly, as well as any suitable control actions stemming from such a determination, e.g., recoding of a passing or failing diagnostic code, etc.

At step 114, the controller 50 records a suitable diagnostic code in memory 54 indicating that the ΔP sensor 25 of FIG. 1 is potentially faulty or functioning out of tolerance, and may optionally include illuminating a warning lamp on the instrument panel of the vehicle 10 of FIG. 1. Additionally, step 114 may entail disabling further of execution of the DPF efficiency diagnostic logic 55 until service can be performed on the exhaust system 14.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
an engine that generates an exhaust stream;
an exhaust system in fluid communication with the engine, wherein the exhaust system includes a particulate filter that removes suspended particulate matter from the exhaust stream;
a sensor that measures a differential pressure across the particulate filter; and
a controller in communication with the sensor that includes a processor and a tangible, non-transitory memory device on which is recorded instructions for calculating, as an executable efficiency diagnostic of the particulate filter, an efficiency of the particulate filter, and for selectively enabling or disabling execution of the efficiency diagnostic of the particulate filter;
wherein the controller is configured to receive the measured differential pressure from the sensor, and to enable or disable the execution of the efficiency diagnostic of the particulate filter as a function of the received measured differential pressure, including enabling the execution of the efficiency diagnostic when a differential pressure offset value of the sensor is less than a calibrated differential pressure offset value and disabling the execution of the efficiency diagnostic when the differential pressure offset value of the sensor exceeds the calibrated differential pressure offset value.

2. The vehicle of claim 1, wherein the engine is a diesel engine.

3. The vehicle of claim 1, wherein the controller is configured to detect a key-off event of the engine, and to execute the recorded instructions only upon detection of the key-off event.

4. The vehicle of claim 3, wherein the controller is configured to wait through a calibrated settling time after detecting the key-off event before receiving the measured differential pressure from the sensor.

5. The vehicle of claim 1, wherein the controller is further configured to:
   compare the measured differential pressure to a calibrated threshold; and
   execute a control action when the measured differential pressure is within an allowable range of the calibrated threshold, including:
      applying the calibrated differential pressure offset value to the measured differential pressure to thereby zero the sensor; and
      executing the particulate filter efficiency diagnostic using measurements from the zeroed sensor.

6. The vehicle of claim 5, wherein the controller is further configured to execute another control action when the measured differential pressure is not within the allowable range of the threshold, including:
   disabling the execution of the particulate filter efficiency diagnostic; and
   setting a diagnostic code indicating that the sensor is faulty.

7. The vehicle of claim 1, wherein the memory device includes recorded logic for executing the efficiency diagnostic of the particulate filter, including a linear transformation block and a Kalman filter block.

8. The vehicle of claim 1, further comprising a temperature sensor positioned in the exhaust stream that measures the temperature of the exhaust stream and transmits the measured temperature to the controller, wherein the controller is further configured to:
   receive the measured temperature of the exhaust stream;
   determine a volumetric flow rate of the exhaust stream;
   generate, using the recorded logic, a set of discrete data points as a function of the measured differential pressure, the measured temperature of the exhaust stream, and the volumetric flow rate; and
   compare the discrete data points to a calibrated threshold to diagnose the efficiency of the particulate filter.

9. The vehicle of claim 8, wherein the controller is configured to generate the set of discrete data points in part by processing an output of the linear transformation block through the Kalman filter using the processor to thereby generate, as each of the data points, a factor equal to $$\frac{1}{R},$$

where the R is the resistance to flow through the particulate filter.

10. The vehicle of claim 1, wherein the controller is further configured to execute the efficiency diagnostic of the particulate filter using a plurality of weighted regression factors, including a factor corresponding to the measured differential pressure, and to assign a higher weight to the measured differential pressure factor near the end of a heated regeneration cycle of the particulate filter.

11. A method comprising:
   measuring, via sensor, an instantaneous differential pressure across a particulate filter in an exhaust stream of an engine;
   receiving, via a controller, the measured instantaneous differential pressure from the sensor; and
   selectively enabling or disabling execution of an efficiency diagnostic of the particulate filter as a function of the instantaneous differential pressure, including enabling execution of the efficiency diagnostic when a differential pressure offset value of the sensor is less than a calibrated differential pressure offset value and disabling the execution when the differential pressure offset value of the sensor exceeds the calibrated differential pressure offset value.

12. The method of claim 11, wherein measuring the instantaneous differential pressure includes measuring the instantaneous differential pressure across a diesel particulate filter of a diesel engine.

13. The method of claim 11, further comprising:
   detecting a key-off event of the engine; and
   executing the recorded instructions only upon detection of the key-off event.

14. The method of claim 13, further comprising:
   waiting through a calibrated settling time after detecting the key-off event before receiving the measured instantaneous differential pressure from the sensor.

15. The method of claim 11, further comprising:
   comparing the measured instantaneous differential pressure to a calibrated threshold;
   executing a first control action when the measured instantaneous differential pressure is within an allowable range of the calibrated threshold, including:
      applying a differential pressure offset value to the measured differential pressure to thereby zero the sensor; and
      enabling the execution of the particulate filter efficiency diagnostic using measurements from the zeroed sensor; and
   executing a second control action when the measured differential pressure is not within the allowable range of the threshold, including:
      disabling the execution of the particulate filter efficiency diagnostic; and
      setting a diagnostic code indicating that the sensor is faulty.

16. The method of claim 11, further comprising:
   measuring a temperature of the exhaust stream;
   transmitting the measured temperature to the controller;
   determining a volumetric flow rate of the exhaust stream through the particulate filter;
   generating, using the recorded logic, a set of discrete data points as a function of the measured differential pressure, the measured temperature of the exhaust stream, and the volumetric flow rate; and
   comparing the discrete data points to a calibrated threshold to diagnose the efficiency of the particulate filter.

17. The method of claim 16, further comprising:
   generating the set of discrete data points in part by processing an output of the linear transformation block through the Kalman filter using the processor to thereby generate, as each of the data points, a factor equal to $$\frac{1}{R},$$

where the R is the resistance to flow through the particulate filter.

18. The method of claim 16, further comprising:
executing the efficiency diagnostic using the controller and a plurality of weighted regression factors, including a factor corresponding to the measured differential pressure; and
assigning a higher weight to the measured differential pressure factor near the end of a heated regeneration cycle of the particulate filter.

19. A method comprising:
measuring an instantaneous differential pressure across a diesel particulate filter (DPF) in an exhaust stream of a diesel engine using a sensor;
receiving, via a controller, the measured instantaneous differential pressure from the sensor;
detecting a key-off event of the engine;
selectively enabling or disabling execution of an efficiency diagnostic of the DPF as a function of the measured instantaneous differential pressure only when the key-off event is detected, including:
waiting through a calibrated settling time after detecting the key-off event;
comparing the measured instantaneous differential pressure to a calibrated threshold;
executing a first control action when the measured instantaneous differential pressure is within an allowable range of the calibrated threshold, including:
applying a differential pressure offset value to the measured differential pressure to thereby zero the sensor; and
enabling the execution of the particulate filter efficiency diagnostic using measurements from the zeroed sensor; and
executing a second control action when the measured instantaneous differential pressure is not within the allowable range of the threshold, including:
disabling the execution of the DPF efficiency diagnostic; and
setting a diagnostic code indicating that the sensor is faulty.

20. The method of claim 19, further comprising:
measuring a temperature of the exhaust stream;
transmitting the measured temperature to the controller;
determining a volumetric flow rate of the exhaust stream through the DPF;
generating, using the recorded logic, a set of discrete data points as a function of the measured differential pressure, the measured temperature of the exhaust stream, and the volumetric flow rate; and
comparing the discrete data points to a calibrated threshold to diagnose the efficiency of the DPF.

* * * * *